Nov. 17, 1959
D. D. LUCAS
2,912,973
PORTABLE BARBECUE
Filed July 26, 1957
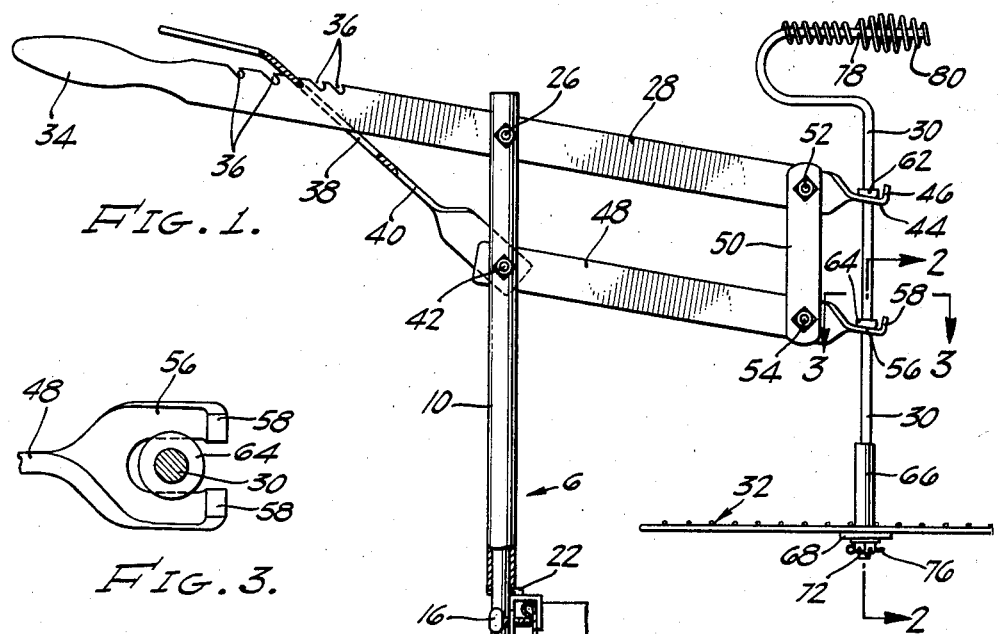
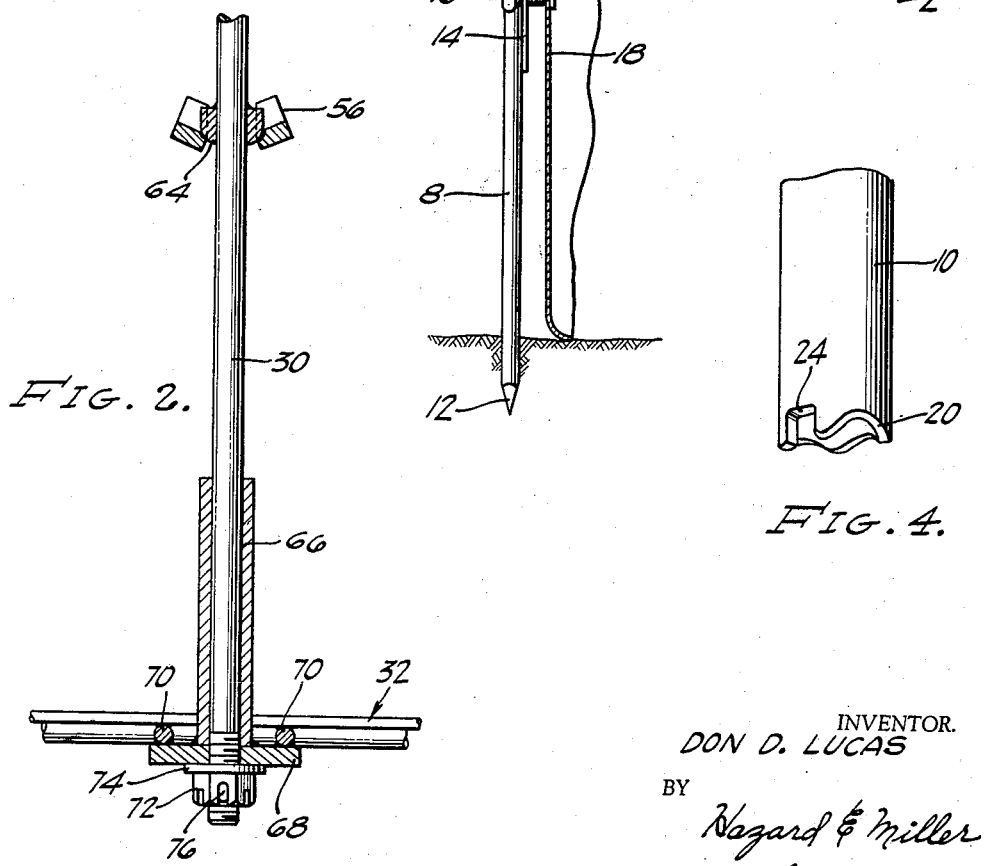
INVENTOR.
DON D. LUCAS
BY
Hazard & Miller
ATTORNEYS

United States Patent Office 2,912,973
Patented Nov. 17, 1959

2,912,973

PORTABLE BARBECUE

Don D. Lucas, Bakersfield, Calif.

Application July 26, 1957, Serial No. 674,393

2 Claims. (Cl. 126—30)

This invention relates to a portable barbecue.

One of the objects of the invention is to provide a portable barbecue, parts of which can be readily disassembled from each other and packed for transportation or storage in a relatively small, compact space.

Another object of the invention is to provide a portable barbecue including an upright support comprising upper and lower sections rotatable relative to each other, wherein a grill element is supported by and laterally of the upper section, means being provided for yieldably retaining the upper and lower sections against relative rotation.

A further object of the invention is to provide means for releasably locking the upper and lower sections of the upright against rotation.

Still a further object of the invention is to provide an upright wherein the lower section has a clamp bracket for securing the entire assembly to the edge of a metal tub or the like, and wherein the releasable lock will hold the grill element in a properly centered position over the tub.

Another object of the invention is to provide a grill support in the form of an arm extending laterally from the upright and a grill rod connected to the grill and extending upwardly to be rotatably and releasably carried at the end of the laterally extending grill support.

The above and other objects will appear from the following description in connection with the accompanying drawing.

Fig. 1 is a view in side elevation of an embodiment of the invention with portions broken away and in section, the structure being shown in conjunction with a portion of a metal tub upon which it is mounted.

Fig. 2 is a sectional view on an enlarged scale substantially on the line 2—2 of Fig. 1.

Fig. 3 is an enlarged sectional detail taken approximately on the line 3—3 of Fig. 1.

Fig. 4 is an enlarged fragmentary perspective view of the lower end of the upper section of the main upright.

In Fig. 1 there is shown an upright 6 which includes a lower section 8 and an upper section 10. The lower section has a pointed end 12 so that it may be pushed into the ground adjacent a fire. Above the lower end of the lower upright section 8 is a bracket 14 which is generally of inverted U-shape, the longer leg of which is secured to the section 8 as by welding. Threaded through the longer leg of the bracket 14 is a thumb screw 16 which is adapted to provide a clamp between it and the other leg of the bracket so that said bracket and the lower section 8 can be securely mounted on the edge of a metal tub 18 or some similar receptacle in which a fire may be built.

The upper upright section 10 is in the form of a tube which is telescopically received on the upper portion of the lower section 8 as viewed in Fig. 4, the tubular upper section 10, about its lower end is undulated as at 20 to provide a cam surface and adapted to rest upon a detent 22 on the lower upright section 8. This detent or abutment, as shown, comprises a cam follower which lies above the bracket 14 and at the same side of the lower section 8 as said bracket. By reason of the undulations 20, the upper section 10 can rest upon the detent 22 in such manner that rotation of the upper section relative to the lower section 8 is yieldably resisted.

The lower end of the upper section 10 is also provided with a relatively deep notch 24 which preferably has parallel sides and is of a size to receive the detent 22. When the detent is in the notch 24 the upper upright section 10 is locked against rotation but can be released by lifting the upper section slightly and partially rotating it to disalign the notch and the detent.

Secured on a horizontal pivot 26 at the upper portion of the upper section 10 is a generally horizontal supporting arm 28 which is adapted to adjustably support a vertical grill rod 30 on the lower end of which is a grill element 32. The arm 28 is preferably made of strap material with its width lying in a vertical plane. Said arm has a portion thereof extending to the left as viewed in Fig. 1 with its end shaped to provide a handle 34 with an adjacent upper edge portion of said arm provided with notches 36. The left end of the arm 28 extends through a slot 38 in a locking lever 40 which is mounted on a pivot 42 on the upper upright section 10 some distance downwardly from the pivot 26. The material of the locking lever 40 at the upper end of the slot 38 is selectively receivable in the notches 36 to permit the grill supporting arm 28 to be fixed in different angular positions.

The right end of the arm 28 is twisted as shown in Fig. 1 and the twisted end is bifurcated as at 44 and the extreme ends of the bifurcated portion are turned upwardly as at 46.

A lever arm 48 is pivotally carried by the pivot 42 on the upper upright section 10 and it extends outwardly beneath the right portion of the arm 28 in parallel relationship thereto. This relationship maintained at the right ends of arm 28 and lever 48 by a link 50 pivotally connected at 52 and 54 to said arm 28 and lever 48.

Just beyond the link 50 the lever 48 is twisted in the same manner as the right end of the arm 28 and is also provided with a similar bifurcation 56 having upturned ends 58 as at 44 and 46 on the arm 28.

In Figs. 1 and 2 there is shown a vertically disposed grill rod 30 having bearing members 62 and 64. The grill rod 30 is receivable in the bifurcated ends of the arm 28 and lever 48, and the bearings 62 and 54 respectively are of such width that they can span the space between the bifurcated portions 44 and 56. Furthermore, the grill rod 30 and its bearings are rotatable relative to the bifurcations 44 and 56.

The lower end of the grill rod 30, best shown in Fig. 2, extends through a sleeve 66. Welded to the lower end of the sleeve 66 is a plate 68 which in turn is welded to the undersides of adjacent rods 70 which extend across the center of the grill 32. The plate 68 is apertured to permit the grill rod 30 to pass through it and the lower end of said grill rod is threaded and provided with a castellated nut 72 beneath a washer 74, the nut being locked on the grill rod 30 by a cotter key 76. Thus, the grill 32 with its plate 68 and sleeve 66, is rotatable on the lower end of the grill rod 30.

It should be noted in Fig. 2 that the two arms of the bifurcation 56, the same being true of the bifurcation 44, are tilted somewhat relative to each other so that they converge downwardly when viewed as in Fig. 2. Thus, the bearing 64 is freely rotatable relative to the bifurcated portion 56 yet held in a centered position. Even though the grill adjusting arm 28 is tilted to different angles, the bearings on the grill rod 30 will be supported by the bifurcations 44 and 56 in such manner that the grill rod can be freely rotated The upper end of the grill rod 30 is bent to provide a handle portion 78 with a spiraled hand grip 80 so that the grill rod and its supporting grill element 32 can be readily handled for removal from the remainder of the structure and also to permit rotation of the grill rod 30 and grill element 32. Furthermore, by reason of the rotatable support of the grill element 32 on the rod 30 said grill element can be rotated independently of the rod 30.

As stated above, the structure as shown in Fig. 1, is indicated as being mounted upon the edge of a metal tub 18 and locked by reason of the location of the detent 22 and the notch 24. This will hold the grill element 32 in a properly centered position over the tub 18. However, the structure is adapted for use without a container such as the tub 18, merely by pressing the pointed lower end of the lower upright section 8 into the ground over a camp fire. In such event, the detent 22 would be disposed in a direction away from the side of the fire so that the undulated portion 20 at the lower end of the upper section 10 will rest upon the detent 22. With this arrangement the upper section 10 and all of the grill structure supported thereby can be swung laterally in either direction from above the fire.

The reason for providing a locked position of the upper and lower sections of the upright 6 when it is disposed on a container such as the tub 18 is that the tub would normally be used where a fire is built on a patio and the dripping of grease from meats on the grill 32 onto the patio floor is undesirable. When it is used in this manner it is not intended that the grill be swung from above the fire in the tub 18 but the detent 22 and cooperating notch 24 are provided merely to hold the assembly in position and yet permit its ready disassembly.

It should be understood that various changes can be made in the form, arrangement, proportions and details of the various parts without departing from the spirit of the invention.

I claim:

1. A portable barbecue comprising an upright, grille-supporting arms pivotally mounted one above the other on the upright for vertical swinging movement relatively thereto and extending laterally from said upright, each grille-supporting arm being composed of flat strap material with its width in a vertical plane, means pivotally connected to said arms connecting said arms to each other adjacent their outer ends to cause them to swing in unison, said arms outwardly of said means being axially twisted to a generally horizontal plane and being bifurcated and having upturned outer end portions, a horizontal grille, a grille rod connected to and extending upwardly from the grille and receivable in the bifurcated portions of the grille-supporting arms, and bearing members on the grille rod of a width to span the bifurcated portions of said arms and removably resting thereon inwardly from said upturned outer end portions.

2. A portable barbecue comprising an upright support composed of telescopic upper and lower sections, the upper section being telescoped over the upper portion of the lower section, a grille-supporting arm carried by and extending laterally from the upper section, a grille supported by the grille-supporting arm and spaced laterally from said upright support, the upper section having an undulant cam surface on the bottom edge thereof the waves of which are smoothly curved, said upper section having at one location in its bottom edge a notch, and a detent on the lower section receivable in said notch to hold the upper section against rotation relative to the lower section, said upper section being capable of being lifted relatively to the lower section and rotated to disalign the notch from the detent and position the undulating cam surface on the detent whereby when the upper section is so positioned the grille will be urged into a position other than that in which it is maintained when the detent is in the notch.

References Cited in the file of this patent

UNITED STATES PATENTS

| 716,560 | Leininger | Dec. 23, 1902 |
| 747,475 | Perky | Dec. 22, 1903 |
| 1,136,120 | Goldsmith | Apr. 20, 1915 |
| 1,187,664 | Sichel | June 20, 1916 |
| 1,368,388 | Church et al. | Feb. 15, 1921 |
| 1,394,228 | Sheridan | Oct. 18, 1921 |
| 1,450,802 | Frye | Apr. 3, 1923 |
| 1,469,508 | Gosselin | Oct. 2, 1923 |
| 1,666,293 | Lorton | Apr. 17, 1928 |
| 1,957,701 | Dart | May 8, 1934 |
| 2,314,248 | Rutledge | Mar. 16, 1943 |
| 2,324,233 | Parsons | July 13, 1943 |
| 2,371,410 | Rickenbacher | Mar. 13, 1945 |
| 2,515,523 | Mancino | July 18, 1950 |
| 2,629,315 | Schaar | Feb. 24, 1953 |
| 2,805,658 | Schlueter | Sept. 10, 1957 |

FOREIGN PATENTS

| 837,802 | France | Nov. 18, 1938 |